(12) United States Patent
Eberle et al.

(10) Patent No.: US 7,072,753 B2
(45) Date of Patent: Jul. 4, 2006

(54) HAZARD-PREVENTION SYSTEM FOR A VEHICLE

(75) Inventors: Walter Eberle, Hochdorf (DE); Markus Hartlieb, Walddorfhaeslach (DE); Markus Hess, Baltmannsweiler (DE); Christian Mayer, Ditzingen (DE); Florent Paviot, Tevoux (FR); Siegfried Rothe, Denkendorf (DE); Roland Stiegler, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 36 days.

(21) Appl. No.: 10/470,201

(22) PCT Filed: Jan. 22, 2002

(86) PCT No.: PCT/EP02/00577

§ 371 (c)(1),
(2), (4) Date: Dec. 23, 2003

(87) PCT Pub. No.: WO02/058962

PCT Pub. Date: Aug. 1, 2002

(65) Prior Publication Data
US 2004/0088095 A1    May 6, 2004

(30) Foreign Application Priority Data
Jan. 26, 2001    (DE)    ............... 101 03 401

(51) Int. Cl.
*B60R 21/01*    (2006.01)
(52) U.S. Cl. ............... 701/45; 340/438; 340/439
(58) Field of Classification Search ............ 701/29, 701/35, 45; 340/438, 439, 459, 460, 461, 340/464, 471, 472, 474
See application file for complete search history.

(56) References Cited

U.S. PATENT DOCUMENTS

| 4,500,868 | A | * | 2/1985 | Tokitsu et al. ............... 340/439 |
| 5,465,079 | A | * | 11/1995 | Bouchard et al. ........... 340/576 |
| 5,821,860 | A | | 10/1998 | Yokoyama et al. |
| 5,835,008 | A | * | 11/1998 | Colemere, Jr. ............... 340/439 |
| 6,060,989 | A | | 5/2000 | Gehlot |
| 6,061,610 | A | | 5/2000 | Boer |
| 6,580,973 | B1 | * | 6/2003 | Leivian et al. ................. 701/1 |
| 6,909,947 | B1 | * | 6/2005 | Douros et al. ................ 701/29 |
| 2002/0091473 | A1 | * | 7/2002 | Gardner et al. ............... 701/35 |
| 2002/0116156 | A1 | * | 8/2002 | Remboski et al. .......... 702/188 |

(Continued)

FOREIGN PATENT DOCUMENTS

DE    43 38 244 A1    5/1994

(Continued)

OTHER PUBLICATIONS

U.S. Appl. No. 60/240,560.*

(Continued)

*Primary Examiner*—Gary Chin
(74) *Attorney, Agent, or Firm*—Crowell & Moring LLP

(57) ABSTRACT

The invention relates to a hazard-prevention system for a vehicle. The vehicle has devices for sensing driving state variables, for sensing ambient data and for sensing the driver's activity, and a data processing device. The data processing device is provided for processing the sensed data and for actuating a safety device in accordance with a predefined control strategy. According to the invention, the vehicle has a device for identifying the driver, and the data processing device derives a driver load factor related specifically to the driver from the driving state variables, the ambient data and the data relating to the activity of the driver, and said driver load factor is used to adapt the control strategy.

13 Claims, 1 Drawing Sheet

U.S. PATENT DOCUMENTS

2002/0151297 A1* 10/2002 Remboski et al. .......... 455/414
2005/0030184 A1* 2/2005 Victor ........................ 340/576
2005/0080565 A1* 4/2005 Olney et al. ................. 701/301

FOREIGN PATENT DOCUMENTS

DE          43 38 244 C2    5/1994
WO          WO 99/01315     1/1999

OTHER PUBLICATIONS

U.S. Appl. No. 60/240,533.*
U.S. Appl. No. 60/240,493.*
U.S. Appl. No. 60/240,444.*
U.S. Appl. No. 60/240,443.*

* cited by examiner

HAZARD-PREVENTION SYSTEM FOR A VEHICLE

BACKGROUND AND SUMMARY OF THE INVENTION

The invention relates to a hazard-prevention system for a vehicle having a device for sensing driving state variables, a device for sensing ambient data, a device for sensing the driver's activity, and a data processing device for processing the sensed data and for actuating a safety device in accordance with a predefined control strategy.

Contemporary systems for increasing safety and comfort for the occupants of a motor vehicle use a number of devices for sensing information. In particular, driving state variables, ambient data and, to an increasing degree, information relating to the vehicle occupants and the driver of the vehicle are sensed.

The driving state variables are understood to be variables such as speed, yaw acceleration, longitudinal acceleration and transverse acceleration, brake pedal setting and accelerator pedal setting, steering angle, the status of operator control elements such as flashing indicator lights and hazard warning lights and the status of sensors and control devices.

Data which is made available by ambient (environmental) sensors, telematic systems and by the vehicle communicating with other vehicles and fixed communication systems is referred to as ambient data. Examples of ambient data is information on the current location (for example whether the route being travelled on is in a residential area, at the edge of a wood or on a bridge), on the category of road (for example whether the road being travelled on is a motorway, a secondary road, a single-lane road, multilane road with or without oncoming traffic), and on the lane on which the actual vehicle is travelling. Further ambient data is the state of the road, temperature, weather conditions, light conditions, ambient noise, air quality and wind conditions, speed, distance, directional movement, type and state of the vehicles travelling ahead, adjacent vehicles, vehicles travelling behind or oncoming vehicles and of other road users.

Information on the vehicle occupants and the driver are, for example the occupation of the seats, the weight of the vehicle occupants, the size of the vehicle occupants and, in particular, the position of the vehicle occupants. Sensing the driver's activity also comprises, for example detecting the eye movements, the viewing direction but also the operator control processes of operator control elements such as, for example, the radio, steering wheel, the gear selector lever, brake pedal, mirror adjustment device, air-conditioning system, seat adjustment device, speech-operated control device, navigation module and mobile telephone.

From such information it is possible to infer that the vehicle occupants are being put at risk or other road users are being put at risk. Systems for evaluating this information in order to reduce a risk for the occupants of motor vehicles are known.

The generic-type-forming German Patent document DE 43 38 244 C2 discloses a hazard-prevention system, which has a driving state monitoring system, a surroundings monitoring system, a driver monitoring system and a device for carrying out a hazard-prevention operation. A hazard situation is determined from the data relating to the movement state and operating state and the ambient data, and the hazard potential of said situation is evaluated. If the vehicle is in a hazardous situation, a decision is made on the basis of the data relating to the state and action of the driver as to whether the driver has perceived the hazardous situation. A hazard-prevention process is carried out only if the driver has not perceived the hazardous situation. In order to prevent the hazard, a visual or audible signal is output or an intervention into the vehicle-movement dynamics of the vehicle is made.

In relation to perceiving the hazardous situation, the driver is also provided with other information, for example route information, radio information or vocal information. The ability to simultaneously perceive a plurality of information items and rapidly process the perceived information is developed to different degrees in people. Owing to a varying information density during a journey, the driver is subject to different load factors depending on the situation. Every driver has an individual, different load factor which he can cope with, and thus in association with this an individual, different perception capability as well as individual long-term changes and short-term fluctuations in his ability to cope with the load factor and perception capability. Fluctuating abilities to cope with a load factor and varying objective load factors can lead to a situation where, given a general warning system in which the individual load factor is not taken into account, a warning is issued to the driver too early or too late, and a hazardous situation is therefore counteracted only to an inadequate degree.

The object of the invention is to reduce the frequency of accidents in motor vehicles and reduce the severity of accidents. This object is achieved according to the invention by a hazard prevention system having a device for sensing driving state variables, a device for sensing ambient data, a device for sensing the driver's activity, and a data processing device for processing the sensed data and for actuating a safety device in accordance with a predefined control strategy. The system is characterized in that the vehicle has a device for identifying the driver, the data processing device derives a driver load factor related specifically to the driver which is derived from the driving state variables, the ambient data and the data relating to the activity of the driver, and the vehicle has a device for adapting the control strategy, which uses the individual driver load factor for this purpose.

The hazard-prevention system for a vehicle contains a device for sensing driving state variables, a device for sensing ambient data, a device for sensing the driver's activity and a data processing device. The data processing device processes the sensed data and actuates a safety device in accordance with a predefined control strategy. According to the invention, the vehicle has a device for identifying the driver. Furthermore, the data processing device derives a measure related specifically to the driver which is characteristic of the instantaneous load factor of the driver from the driving state variables, the ambient data and the data relating to the activity of the driver. The control device adapts the control strategy for actuating the safety device to the measure of the load factor of the driver. The advantage of this hazard-prevention system of a vehicle is that the driver's safety and comfort are increased and the safety of the vehicle occupants and of other road users is increased.

The driver is identified by evaluating vehicle-related variables, that is to say, for example, data is transferred from the gearbox controller or engine controller and is used to describe the type of driver (aggressive, nervous, tentative, dynamic). In addition, interventions by the driver in systems for controlling the dynamics of vehicle movement such as ABS (Anti-lock Brake System) ESP (Electronic Stability Program, Driving Stability System), BBS (Brake Boosting System) are sensed and evaluated. Personal features such as the setting of the seat, the setting of the rear mirror, the setting of the air-conditioning system or the preferred radio station can be used to identify the driver. Alternatively, the identification of the driver is carried out by means of a person-related use authorization means (for example key, keyless go card) or by means of eye recognition, speech recognition, recognition of fingerprints).

In one development of the hazard-prevention system, the vehicle has a device for storing the driver-related history, which contains data which is characteristic of the respective driver. The data processing device uses, in addition to the information specified, the driver-related history to derive a measure of the load factor of the driver. The device for storing the driver-related history senses, in particular, the driver's activity and creates a history of the driver's activity. The driver-related history can additionally contain ambient data and driving state variables. It is possible, for example, to assign each driver a route profile, a speed profile, a specific route which is travelled on regularly and a specific safety distance. In the driver-related history it is possible to distinguish between a long-term history and a short-term history. The short-term history contains the characteristic features of the current journey or of another predefined time period, for example, a day. The long-term driver-related history contains the characteristic specific features of the driver over a predefined relatively long period of time, for example, since the last time the owner of the vehicle changed, since an illness or an accident of the driver, since the last time the tires were changed or the last service or since the driver changed workshop.

By evaluating a history it is detected, for example, whether the current journey is a routine journey which is characterized by an accident risk which is changed. Furthermore, when evaluating a risk it is possible to take into account any particular strengths, weaknesses and particularities of the driver. These features relate, for example, to the attentiveness (reduced during routine journey), perception (relatively uncertain driving style when travelling at night as opposed to day), reaction capability (longer time until the pedal is activated) or the specific capability, for example when simultaneously controlling a plurality of functions (for example driving function, plus navigation, plus mobile radio). An advantage of this development of the hazard-prevention system is that the determination of the degree of loading on the driver is improved, as a result of which safety is further increased in road traffic.

In one embodiment of the hazard-prevention system for a vehicle, the safety device comprises an information and warning system or is formed by an information and warning system. The processing of the sensed data is carried out by the data processing device in such a way that those action possibilities of the driver which reduce or rule out a hazard are determined and that it is checked whether the driver is behaving in accordance with the determined action possibilities. In addition, it is determined whether the measure of the hazard changes rapidly and whether this measure lies within predefinable limits. If the measure of the hazard exceeds a predefinable limit, the driver is normally informed, in a first step and/or warned as a function of the severity and the profile of the hazard.

In the following example, the vehicle is travelling with a cruise controller with a device for controlling the distance between vehicles on a road with good infrastructure. The driver's activity is sensed and the reaction capability, the degree of attentiveness, etc. are evaluated. A current driver load factor is derived from this driver data which is determined and evaluated, from further individual driver data and, for example, the ambient data. The time of issuing an information item warning to the driver, for example a transfer request which is issued in predefined situations by the cruise control device for controlling distance between vehicles, is calculated from this driver load factor. If the driving situation then changes to the effect that the driver is to be requested to perform the longitudinal control of the vehicle because the distance from an obstacle is reduced below a predefinable safety distance, the driver will receive a first information item/warning. If there is no reaction from the driver after a waiting time, which is predefined in particular as a function of the driver load factor, a second warning will be issued. The warnings can be issued in such a way that the normal reaction of a driver to these warnings brings about an action which counteracts the hazardous situation. Warnings for the driver which are provided for this purpose may address various senses and may be, for example, audible, visual, haptic or olfactory.

As an alternative to or in addition to information/a warning to the driver, a warning signal can be transmitted to another road user, in particular to a non-motorized road user. When there is the risk of a collision with a pedestrian, it is possible to generate a noise or a light signal, which is intended to cause the pedestrian to react in a way which is suitable to prevent the collision, for example by the pedestrian stopping. The signals can be varied as a function of the hazardous situation, for example a light signal can be changed in intensity, in the flashing frequency, in color and direction. In another situation, an acoustic warning signal, for example the squealing of a tire can cause a driver of a motor bike to refrain from performing an originally planned change in the direction of travel, avoiding a collision between the vehicle and the rider of the motorbike. The described warning to other road users (partner warning) is carried out according to the invention taking into account the individual driver load factor and the possible actions by the driver and/or those actually carried out by the driver.

It is also possible to issue a warning to others without taking into account the specific load factor but taking into account the possible and/or actual actions of the driver. Furthermore, a warning to others without taking into account the specific driver load factor and without taking into account the possible and/or actual actions of the driver can be carried out in order to reduce the probability of an accident or the severity of an accident. A warning to others for non-motorized road users may, for example, sound the horn at a pedestrian in order to prevent him from stepping onto the carriageway or walking into the likely path of the vehicle on the carriageway onto which he has just stepped.

In another refinement of the hazard-prevention system for a vehicle, the safety device comprises a system for controlling the dynamics of vehicle movement. Here, the safety device can comprise exclusively a system for controlling the dynamics of vehicle movement or a system for controlling the dynamics of vehicle movement in conjunction with an information and warning system, or be formed from these systems. If, with or without a previous information/warning being issued to the driver, there is no driver reaction, an inadequate driver reaction or a driver reaction which would increase the hazard, the hazard-prevention system intervenes in the vehicle movement dynamics. This may be an intervention in the brake system, for example emergency braking, an intervention in the vehicle steering system, for example an avoidance maneuver or some other intervention into the dynamics of the vehicle movement. Such an intervention by the hazard-prevention system can be carried out in order to avoid an accident and to reduce the severity of an accident. Such an intervention is aborted as soon as there is sufficient driver reaction or a reduction in the hazard below a prescribed value. An example of a driver reaction which leads to an intervention being aborted is the activation of the brake pedal by the driver during automatic braking. As a result, the driver assumes responsibility for the braking operation and the automatic braking is terminated.

In a further refinement of the hazard-prevention system for a vehicle, the safety device comprises a vehicle-occupant protection system which acts on the movement of the vehicle occupant and is intended to make the consequences of an accident less severe. When there is a predefined hazard, determined taking into account the driver load factor, the vehicle occupant protection system which acts on the movement of the vehicle occupant is actuated by the hazard-prevention system with or without a preceding information/warning function and/or intervention in the vehicle movement dynamics. Examples of protection systems which act on the movement of a vehicle occupant are conventional restraint systems such as airbags and seat belt pretensioners and novel devices for absorbing energy, in which the hardness and the deformation behavior can be controlled. Means for preconditioning the vehicle occupants, for example by adapting the setting of the seat system in accordance with the hazard, or reversible protection systems, such as electromotive seat belt pretensioners, are also to be understood as vehicle occupant protection systems which act on the movement of a vehicle occupant.

After a hazardous situation, in particular an accident, the hazard-prevention system checks whether the driver is exerting control over the vehicle and whether a further hazard, for example due to a possible secondary collision, is present. The vehicle is, if appropriate, placed in a safe state (ignition off, fuel supply off, parking brake on, control of the drive) and an automatic emergency call is emitted. The severity of injuries is estimated by means of the sensed parameters and transmitted to the rescue services.

In addition to determining the current driver load factor it is possible to predict an expected driver load factor from the sensed data, which factor is less reliable the longer the prediction time period which is selected. By means of such a prediction, it is possible to specify the time for the issuing of information/warnings to the driver in such a way that the gain in safety is as large as possible. For example, an information/warning message is brought forward in order to output it in good time before an expected increased loading on the driver or it is delayed in order to output it only after a driver load factor which is increased in the short term. As an alternative or in addition to this it is possible to select a suitable sense for the information/warning, for example it is possible to output an audible, haptic or olfactory warning/information when there is a high degree of visual loading on the driver. When there is a high degree of acoustic loading, a visual, haptic or olfactory warning/information item can correspondingly be issued and/or loading on the driver is reduced by reducing the volume of the radio, for example.

There are various possible ways of advantageously configuring the teaching of the present invention. One advantageous embodiment of the hazard-prevention system according to the invention will be described in more detail below with reference to the drawing.

DETAILED DESCRIPTION OF THE DRAWING

Figure 1:
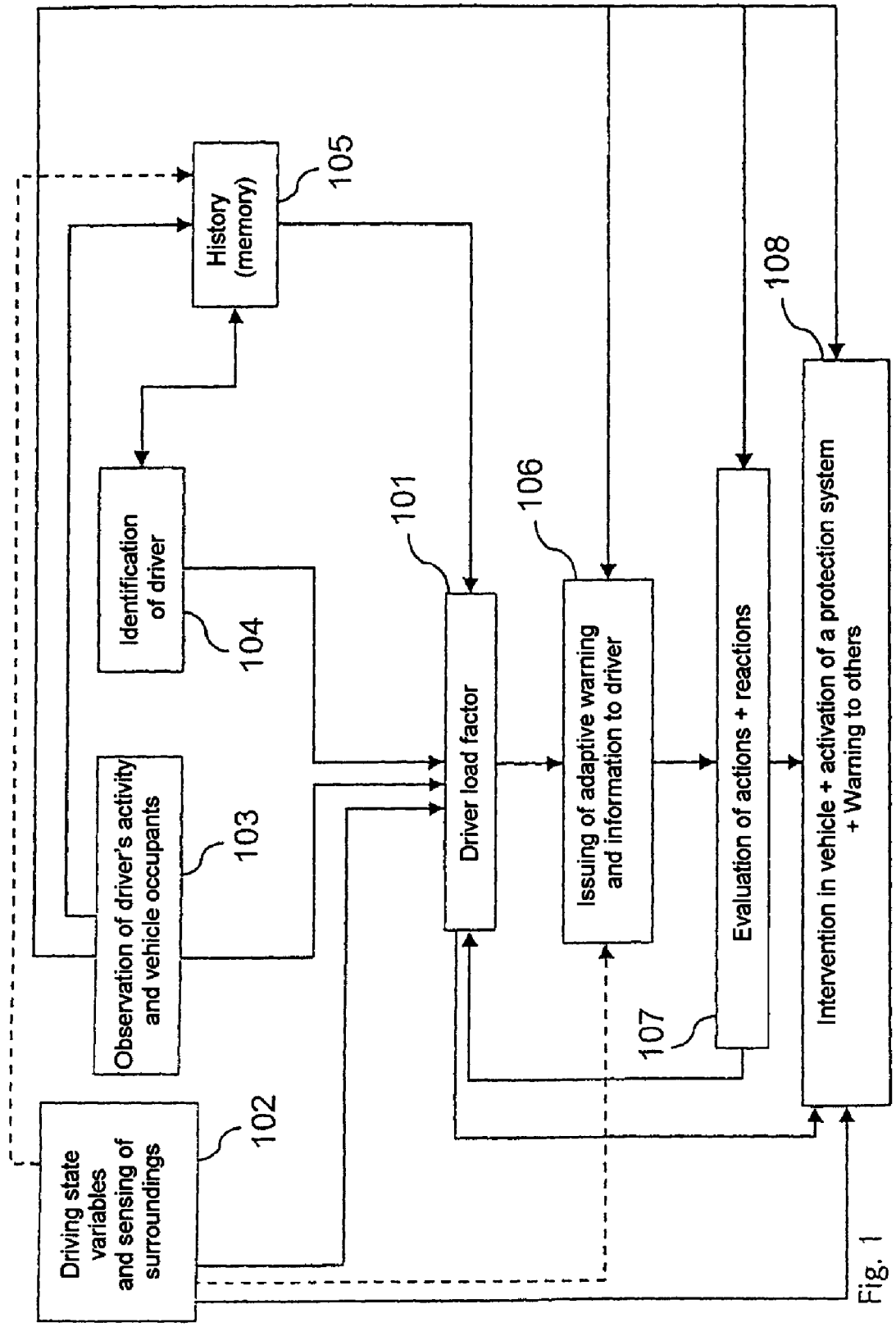
FIG. 1 shows a schematic block diagram of an advantageous embodiment of the hazard-prevention system according to the invention.

An essential component of the hazard-prevention system is the module for determining a driver load factor 101 which, in a simple embodiment, divides the severity of the driver load factor into a plurality of classes. An example of the division of the classes are the classes: no load factor, low load factor, medium load factor, increased load factor, high load factor and overloading. In a refined embodiment, the driver load factor is categorized by the module 101 and a load class which has been determined is additionally assigned to one or more load categories. Examples of load categories are: acoustic load, visual load, continuous load, load peak and loading by external influences. In order to determine the specific driver load factor, information is used from the module 102 for sensing the driving state variables and the surroundings, the module 103 for observing the driver's activity and vehicle occupants and the module 104 for identifying the driver. The module 102 for sensing the driving state variables and the surroundings, the module 103 for observing the driver's activity and vehicle occupants and the module 104 for identifying the driver are connected to a memory 105 for recording features of the driver which characterize the driver, can be used to identify him or permit the state of the driver to be evaluated by comparing the stored data with current data. Data for characterizing the driver are, for example, personal strengths and weaknesses, experience, typologies, medical data, sex and age. Data which can be used for identification are, for example, voice, driver type or operating pattern and position of adjustment devices such as air-conditioning system, pedals, seat adjustment means, steering wheel and joystick. The module 103 for sensing the driver's activity and observing the vehicle occupants also senses facial expressions, gestures and physiological data of the driver and the position and the actions of the vehicle occupants and these are used in particular to determine the load on the driver. Further parameters which can be determined by the module 103 and taken into account in the module 101 are driver fatigue, the condition of the driver, the reaction characteristics and the reaction time of the driver, the driving time and the current speed profile. To a certain extent special sensors are necessary to sense these parameters. For example, driver fatigue is determined using a viewing direction recognition means, a means for observing the eyes and/or by sensing the steering angle and the actuation of the pedals. Module 102 registers data on the profile of the route so that, for example, the journey on a routine route is detected by comparison with the memory 105.

Data from the memory 105 is additionally used to determine the driver load factor in module 101. In particular, this data relates to the characteristics of the driver in similar situations to the situation to be assessed. If data has been stored about the surroundings or the route profile, it is also taken into account in the determination of the driver load factor.

Module 106 has the function, while taking into account the individual driver load factor, of informing and warning the driver in such a way that he prevents the hazardous situation. This takes place, for example, by virtue of the fact that the driver is relieved by the audio volume being reduced. Another possible way of adapting the driver warning is to adapt the warning times to the driver load factor, to the type of driving and to the perception character of the driver. Furthermore, a sense for informing and warning the driver can be selected as a function of the load factor or of the hazard.

After the warning/information has been issued, the reaction of the driver to the warning/information is assessed in module 107 and the actions of the driver are evaluated to determine whether he has perceived the information/warning. For this purpose, a viewing direction detection means may be used which provides a decision basis for whether the driver has perceived a warning or an obstacle. As an alternative or in addition it is possible to carry out the evaluation of the driver actions to determine whether they are suitable for preventing the hazard or making possible consequences of an accident less severe. The evaluation of the actions and reaction of the driver from module 107 is taken into account in the determination of the driver load factor in module 101.

Depending on the result of the evaluation in module 107, module 108 brings about a possible intervention into the dynamics of the vehicle movement, causes protection systems to be actuated and/or causes a warning to be issued to other road users. The protection systems which can be actuated may act kinematically or dynamically by a restraint system being actuated or by a damping element being activated. It is possible, for example, for a degree of spring stiffness, a material property, a system pressure or the flow characteristics of a fluid to be changed for this purpose.

The invention claimed is:

1. A hazard-prevention system for a vehicle, comprising:
   a device for sensing driving state variables;
   a device for sensing ambient data;
   a device for sensing a driver's activity;
   a device for identifying a particular driver; and
   a data processing device for processing the sensed driving state variables, the sensed ambient data and the sensed driver's activity, and actuating a safety device in accordance with a predetermined control strategy, the data processing device deriving a driver load factor related specifically to the particular driver, the driver load factor being derived from the sensed driving state variables, the sensed ambient data, and the sensed data relating to the driver's activity; and
   a device for adapting the control strategy, which utilizes the driver load factor related specifically to the particular driver for adapting the control strategy.

2. The hazard-prevention system according to claim 1, further comprising:
   a device for storing a driver-related history containing data characteristic of the particular driver; and
   wherein the data processing device additionally uses the driver-related history to derive the driver load factor related specifically to the particular driver.

3. The hazard-prevention system according to claim 1, wherein the safety device includes an information and warning system.

4. The hazard-prevention system according to claim 2, wherein the safety device includes an information and warning system.

5. The hazard-prevention system according to claim 1, wherein the safety device includes a system for controlling vehicle movement dynamics.

6. The hazard-prevention system according to claim 2, wherein the safety device includes a system for controlling vehicle movement dynamics.

7. The hazard-prevention system according to claim 1, wherein the safety device includes a vehicle occupant protection system which acts on movement of an occupant of the vehicle and is designed to lessen the consequences of accidents.

8. The hazard-prevention system according to claim 2, wherein the safety device includes a vehicle occupant protection system which acts on movement of an occupant of the vehicle and is designed to lessen the consequences of accidents.

9. A hazard-prevention system for a vehicle, comprising:
   a driver identification device;
   a processor coupling with the driver identification device, the processor deriving a driver load factor individually matched to a particular driver based on driving state variables, environmental data, and driver activity data; and
   wherein the processor adapts a control strategy for actuating a safety device based on the derived individual driver load factor.

10. The hazard-prevention system according to claim 9, further comprising a memory storing data historically characteristic of the driver; and
    wherein the processor additionally uses the stored data to derive the individually matched driver load factor.

11. The hazard-prevention system according to claim 9, wherein the safety device comprises an information and warning system.

12. A method for adapting a control strategy for a safety device in a hazard-prevention system of a vehicle, the method comprising the acts of:
    sensing driving state variables of the vehicle;
    sensing environmental data related to the vehicle;
    identifying a particular driver of the vehicle;
    sensing the particular driver's activity;
    deriving a driver load factor individually matched to the particular driver from the driving state variables, the environmental data and, the driver's activity; and
    adapting the control strategy for actuating a said safety device based on the individually matched driver load factor.

13. A software product, comprising a computer readable medium having stored thereon program code segments that:
    process driving state variables for a vehicle;
    process environmental data related to the vehicle;
    identify a particular driver of the vehicle;
    process the particular driver's activity;
    derive a driver load factor related to the particular driver based on the processed driving state variables, environmental data and driver's activity; and
    adapt a predetermined control strategy for actuating a safety device utilizing the derived driver load factor.

* * * * *